(12) United States Patent
Cha et al.

(10) Patent No.: US 9,755,502 B2
(45) Date of Patent: Sep. 5, 2017

(54) START-UP CIRCUIT AND POWER DEVICE USING THE SAME

(71) Applicants: SOLUM CO., LTD., Suwon-si (KR); University of Seoul Industry Cooperation Foundation, Seoul (KR)

(72) Inventors: Sang Hyun Cha, Seoul (KR); Soo Hyun Moon, Anyang-si (KR); Hye Jin Lee, Seoul (KR); Joong Ho Choi, Seongnam-si (KR); Ji Hwan Kim, Seoul (KR); Chang Seok Lee, Seoul (KR); Yun Joong Lee, Seoul (KR)

(73) Assignees: UNIVERSITY OF SEOUL INDUSTRY COOPERATION FOUNDATION, Seoul (KR); SOLUM CO., LTD., Suwon-Si (KR)

( * ) Notice: Subject to any disclaimer, the term of this patent is extended or adjusted under 35 U.S.C. 154(b) by 91 days.

(21) Appl. No.: 14/694,040

(22) Filed: Apr. 23, 2015

(65) Prior Publication Data

US 2015/0318779 A1 Nov. 5, 2015

(30) Foreign Application Priority Data

Apr. 30, 2014 (KR) .......................... 10-2014-0052251

(51) Int. Cl.
*H02M 1/36* (2007.01)
*H02M 3/335* (2006.01)
*H02M 1/00* (2006.01)

(52) U.S. Cl.
CPC ............ *H02M 1/36* (2013.01); *H02M 3/335* (2013.01); *H02M 3/33507* (2013.01); *H02M 2001/0006* (2013.01)

(58) Field of Classification Search
CPC .... H02M 1/36; H02M 3/33507; H02M 3/335; H02M 7/5157; G05F 1/445; G05F 1/468
See application file for complete search history.

(56) References Cited

U.S. PATENT DOCUMENTS

| | | | | |
|---|---|---|---|---|
| 6,069,805 | A * | 5/2000 | Anderson, Jr. .......... | H02M 7/12 363/132 |
| 2007/0041227 | A1 * | 2/2007 | Hall .................. | H02M 3/33507 363/49 |
| 2007/0058398 | A1 * | 3/2007 | Yang ...................... | H02M 1/36 363/16 |

(Continued)

FOREIGN PATENT DOCUMENTS

KR 1999-0085364 A 12/1999

*Primary Examiner* — Gustavo Rosario Benitez (57) ABSTRACT

Disclosed herein are a start-up circuit capable of reducing a leakage current to reduce power consumption, and a power device using the same. The start-up circuit includes: a bias unit connected between a first power source and a second power source and allowing a first current to flow from the first power source to the second power source according to a predetermined voltage; a first start unit connected to the bias unit and driving a second current to apply the predetermined voltage to the bias unit, and stopping driving the second current when a voltage received from the second power source reaches a first voltage; and a second start unit connected to the bias unit and driving a third current, the predetermined voltage being applied to the bias unit by the third current, and stopping driving the third current upon receiving a stop signal.

15 Claims, 6 Drawing Sheets

(56) References Cited

U.S. PATENT DOCUMENTS

| | | | |
|---|---|---|---|
| 2010/0244804 A1* | 9/2010 | Zong | H02M 1/36 323/299 |
| 2010/0259952 A1* | 10/2010 | Zhu | H02M 1/36 363/20 |
| 2011/0228565 A1* | 9/2011 | Griffin | H02M 1/36 363/21.01 |
| 2014/0177284 A1* | 6/2014 | Nakano | H02M 1/36 363/19 |
| 2014/0233283 A1* | 8/2014 | Al-Shyoukh | H02M 1/36 363/49 |
| 2015/0003118 A1* | 1/2015 | Shin | H02M 3/33507 363/21.12 |
| 2015/0194875 A1* | 7/2015 | Jutras | H02M 1/36 363/49 |

* cited by examiner

START-UP CIRCUIT AND POWER DEVICE USING THE SAME

CROSS REFERENCE(S) TO RELATED APPLICATIONS

This application claims the benefit under 35 U.S.C. Section 119 of Korean Patent Application Serial No. 10-2014-0052251, entitled "Start-up Circuit and Power Device Using the Same" filed on Apr. 30, 2014, which is hereby incorporated by reference in its entirety into this application.

BACKGROUND OF THE INVENTION

1. Technical Field

The present invention relates to a start-up circuit and a power device using the same.

2. Description of the Related Art

Switch mode power supplies (SMPS), such as a DC-DC converter, an AC-DC converter, or the like, using a high input voltage are used in extensive electronic equipment. In order to reduce power consumption of SMPS, a method for reducing power consumption in a start-up circuit is required. A start-up circuit supplies a source voltage for driving to electronic equipment at an initial stage of driving. The start-up circuit initially drives a current to allow a normal current to be supplied to electronic equipment by the driven current, thus operating the electronic equipment. However, when the start-up circuit continues to drive a current even during a normal operation, power consumption of the electronic equipment increases.

SUMMARY OF THE INVENTION

An object of the present invention is to provide a start-up circuit capable of reducing a leakage current to reduce power consumption, and a power device using the same.

The present invention is derived from research conducted as part of IT research center fostering work of National IT Industry Promotion Agency by Ministry of Science, ICT and Future Planning and University of Seoul Industry Cooperation Foundation According to an exemplary embodiment of the present invention, there is provided a start-up circuit including: a bias unit allowing a first current to flow from a first power source to a second power source according to a predetermined voltage; a first start unit driving a second current to apply the predetermined voltage to the bias unit, and stopping driving the second current when a voltage received from the second power source reaches a first voltage; and a second start unit driving a third current to apply the predetermined voltage to the bias unit, and stopping driving the third current upon receiving a stop signal.

According to another exemplary embodiment of the present invention, there is provided a power device including: a power generating unit generating a predetermined voltage under the control of an integrated circuit (IC) controller; a start-up circuit supplying the predetermined voltage to the IC controller; and a feedback unit supplying the voltage generated by the power generating unit to the start-up circuit to correct the predetermined voltage to enable the power generating unit to stably generate a voltage. The start-up circuit includes: a bias unit allowing a first current to flow from a first power source to a second power source according to a predetermined voltage; a first start unit driving a second current to apply the predetermined voltage to the bias unit, and stopping driving the second current when a voltage received from the second power source reaches a first voltage; and a second start unit driving a third current to apply the predetermined voltage to the bias unit, and stopping driving the third current upon receiving a stop signal.

DETAILED DESCRIPTION OF THE INVENTION

The acting effects and technical configuration with respect to objects of a start-up circuit and a power device using the same according to the present invention will be clearly understood by the following description in which exemplary embodiments of the present invention are described with reference to the accompanying drawings.

Further, when it is determined that the detailed description of the known art related to the present invention may obscure the gist of the present invention, the detailed description thereof will be omitted. In the description, the terms "first", "second", and the like, are used to distinguish one element from another element, and the elements are not defined by the above terms.

Exemplary embodiments of the present invention will be described in detail with reference to the accompanying drawings. These exemplary embodiments will be described in detail for those skilled in the art in order to practice the present invention. It should be appreciated that various exemplary embodiments of the present invention are different but do not have to be exclusive. For example, specific shapes, configurations, and characteristics described in an exemplary embodiment of the present invention may be implemented in another exemplary embodiment without departing from the spirit and the scope of the present invention. In addition, it should be understood that position and arrangement of individual components in each disclosed exemplary embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawings.

Hereinafter, exemplary embodiments of the present invention will be described in detail with reference to the accompanying drawings so that those skilled in the art may easily practice the present invention.

Figure 1:
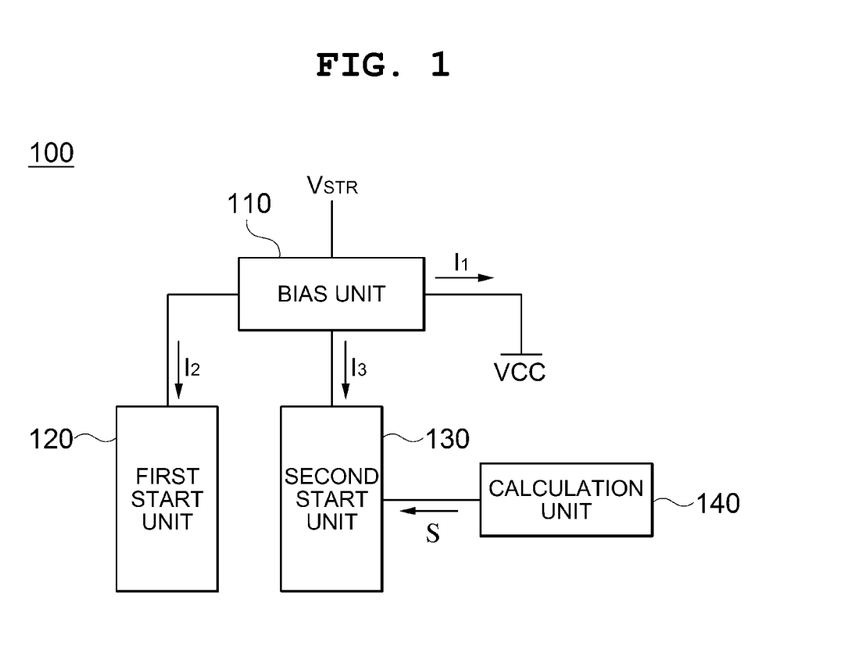
FIG. 1 is a block diagram illustrating a configuration of a start-up circuit according to an exemplary embodiment of the present invention.

FIG. 1 is a block diagram of a start-up circuit according to an exemplary embodiment of the present invention.

Referring to FIG. 1, a start-up circuit 100 may include a bias unit 110, a first start unit 120, and a second start unit 130.

The bias unit 110 may be connected between a first power source $V_{STR}$ and a second power source VCC and allow a first current I1 to flow from the first power source $V_{STR}$ to the second power source VCC in response to a predetermined voltage. As the first current I1 flows toward the second power source VCC, the second power source VCC may have the predetermined voltage.

The first start unit 120 may be connected to the bias unit 110 and drive a second current I2 to allow the predetermined voltage to be applied to the bias unit 110. Also, the first start unit 120 may receive a voltage from the second power source VCC so the voltage from the second power source VCC reaches a first voltage, the first start unit 120 may stop the driving of the second current I2. When the second current I2 is driven, the first start unit 120 may allow the first current I1 to flow to the bias unit 110. Namely, when the second current I2 flows to the first start unit 120, the predetermined voltage may be applied to the bias unit 110 and the first current I1 may flow in the bias unit 110.

The second start unit 130 may be connected to the bias unit 110 and drive a third current I3 to allow the predetermined voltage to be applied to the bias unit 110. The second start unit 130 may be connected to the first start unit 120 in parallel. Although the second current I2 driven by the first start unit 120 is not driven any longer, the second start unit 130 may continue to drive the third current I3, and thus, the predetermined voltage may continue to be applied to the bias unit 110. Thus, the first current I1 may continue to flow to the bias unit 110. The second start unit 130 may stop driving the third current I3 upon receipt of a signal S determined by a stop signal (stop). Thus, after the first start unit 120 stops driving the second current I2, when the second start unit 130 stops driving the third current I3, the first current I1 flowing in the bias unit 110 may be stopped. When the first current I1 flowing in the bias unit 110 is stopped, the current flowing in the first start unit 120 and the second start unit 130 may also be stopped, reducing power consumption of the start-up circuit 100.

In an embodiment, the start-up circuit 100 may further include a calculation unit 140 delivering a stop signal to the second start unit 130. The calculation unit 140 may deliver a stop signal to the second start unit 130 through a pre-set operation. Namely, after a voltage of the second power source VCC is changed to the first voltage, when the first voltage of the second power source VCC is changed to a second voltage higher than the first voltage, the calculation unit 140 may deliver the stop signal to the second start unit 130 to make the second start unit 130 stop driving the third current.

Start-Up Circuit
<First Embodiment>

Figure 2:
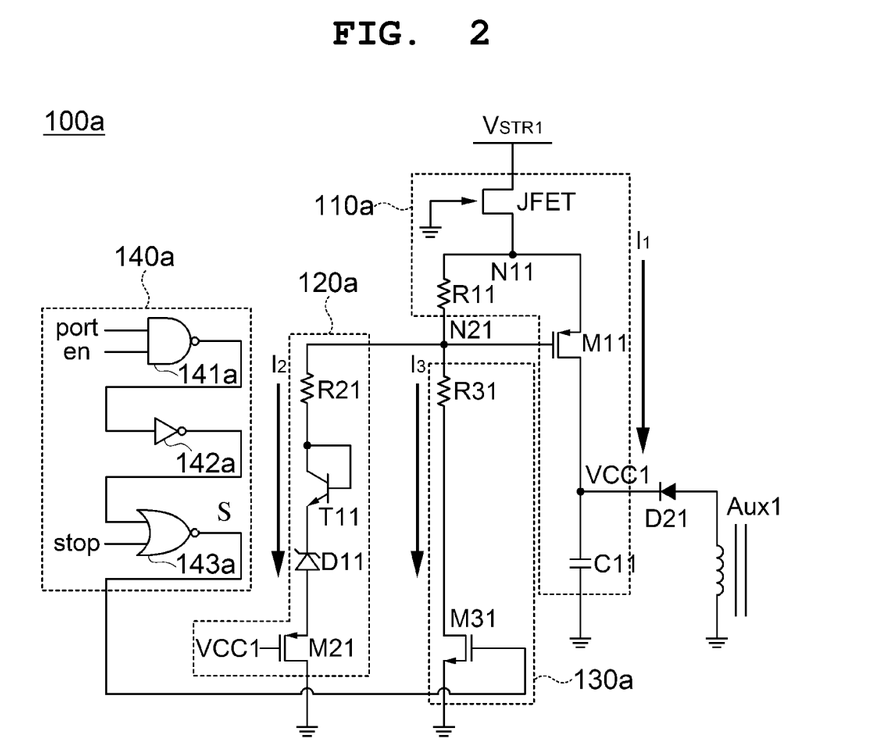
FIG. 2 is a circuit diagram of the start-up circuit illustrated in FIG. 1 according to a first exemplary embodiment of the present invention.

FIG. 2 is a circuit diagram illustrating a configuration of the start-up circuit illustrated in FIG. 1 according to a first exemplary embodiment of the present invention.

Referring to FIG. 2, a start-up circuit 100a may include a bias unit 110a, a first start unit 120a, and a second start unit 130a.

The bias unit 110a may include a first transistor M11 and a first resistor R11. A first electrode of the first transistor M11 and one end of the first resistor R11 may be connected to a first node N11, and a gate electrode of the first transistor M11 and the other end of the first resistor R11 may be connected to a second node N21. A second electrode of the first transistor M11 may be connected to a second power source VCC1. The second power source VCC1 may include a first capacitor C11, and a voltage of the second power source VCC1 may be a voltage stored in the first capacitor C11. In the bias unit 110a, a junction field effect transistor (JFET) may be connected between a first power source $V_{STR1}$ and the first node N11, and first power $V_{STR1}$ may be delivered to the first node N11 according to an operation of the JFET. The first capacitor C11 connected to the second power source VCC1 of the bias unit 110a may receive a voltage through an auxiliary winding Aux1 to correct a voltage charged therein. Also, a diode D21 may be connected between the auxiliary winding Aux1 and the second power source VCC1, and the diode D21 may prevent a current from flowing from the second power source VCC1 to the auxiliary winding Aux1.

The first start unit 120a may include a second resistor R21 and a second transistor M21. One end of the second resistor R21 may be connected to the second node N21 and the other end thereof may be connected to a first electrode of the second transistor M21. The first electrode of the second transistor M21 may be connected to the second resistor R21, a second electrode thereof may be connected to a ground, and a gate electrode thereof may be connected to the second power source VCC1. In the first start unit 120a, a transistor T11 and a Zener diode D11 may be connected between the other end of the second resistor R21 and the first electrode of the second transistor M21. Also, in the first start unit 120a, at least one of the second resistor R21, the diode-connected transistor T11, and the Zener diode D11 may be disposed on a path between the second node N21 and the second transistor M21 to form a predetermined voltage in the second node N21. The predetermined voltage formed in the second node N21 may be a voltage divided by the first resistor R11 and the second resistor R21.

The second start unit 130a may include a third resistor R31 and a third transistor M31. One end of the third resistor R31 may be connected to the second node N21 and the other end thereof may be connected to a first electrode of the third transistor M31. The first electrode of the third transistor M31 may be connected to one end of the third resistor R31 and a second electrode thereof may be connected to a ground. Also, a stop signal may be delivered to a gate electrode of the third transistor M31. Here, it is illustrated that the third resistor R31 is connected between the second node N21 and the first electrode of the third transistor M31, but the present invention is not limited thereto and at least one of a resistor, a Zener diode, and a transistor may be connected between the second node N21 and the first electrode of the third transistor M31 and apply a voltage to the gate electrode of the second node N21.

In an embodiment, a calculation unit 140a delivering a stop signal may be further connected in the start-up circuit 100a. The calculation unit 140a may be connected to the second start unit 130a to deliver a stop signal to the second start unit 130a. In particular, the calculation unit 140a may deliver the stop signal to the gate electrode of the third transistor M31. The calculation unit 140a may include a plurality of logic gates, and the plurality of logic gates may include a NAND gate 141a, an inverter 142a, and a NOR gate 143a. The calculation unit 140a may process a stop signal, an enable signal en, and the like, using the respective logic gates, and output the stop signal at a predetermined time.

<Second Embodiment>

Figure 3:
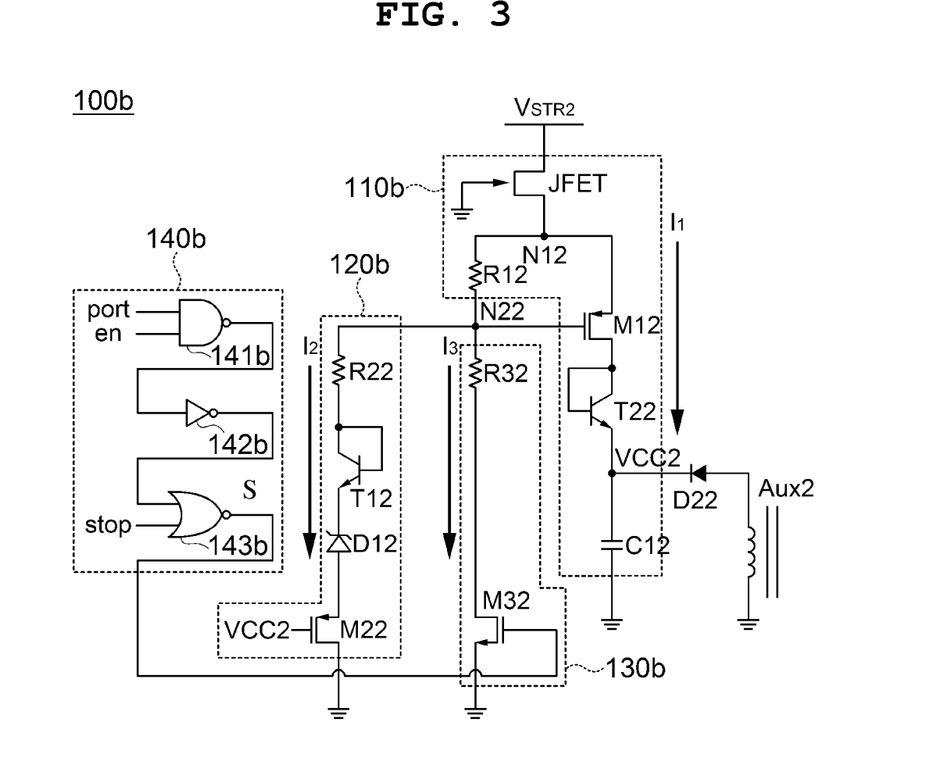
FIG. 3 is a circuit diagram illustrating a configuration of the start-up circuit illustrated in FIG. 1 according to a second exemplary embodiment of the present invention.

FIG. 3 is a circuit diagram illustrating a configuration of the start-up circuit illustrated in FIG. 1 according to a second exemplary embodiment of the present invention.

Referring to FIG. 3, a start-up circuit 100b may include a bias unit 110b, a first start unit 120b, and a second start unit 130b.

The bias unit 110b may include a first transistor M12, a first resistor R12, and a first diode T22. A first electrode of the first transistor M12 and one end of the first resistor R12 may be connected to a first node N12, and a gate electrode of the first transistor M12 and the other end of the first resistor R12 may be connected to a second node N22. A second electrode of the first transistor M12 may be connected to an anode electrode of the first diode T22. An anode electrode of the first diode T22 may be connected to the second electrode of the first transistor M12 and a cathode electrode thereof may be connected to a second power source VCC2. The first diode T22 may prevent a current from flowing from the second power source VCC2 to a first power source $V_{STR2}$ when a voltage of the first power source $V_{STR2}$ is lower than that of the second power source VCC2. The first diode T22 may be formed as a transistor, and a first electrode and a gate of the transistor may be commonly connected to the second electrode of the first transistor M12 and a second electrode thereof may be connected to the second power source VCC2, making the transistor diode-connected. A voltage of the second power source VCC2 may be a voltage stored in the first capacitor C12. In the bias unit 110b, a junction field effect transistor (JFET) may be connected between a first power source $V_{STR2}$ and the first node N12, and first power $V_{STR2}$ may be delivered to the first node N12 according to an operation of the JFET. The first capacitor C12 connected to the second power source VCC2 of the bias unit 110b may receive a voltage through an auxiliary winding Aux2 and correct a voltage charged therein. Also, a second diode D22 may be connected between the auxiliary winding Aux2 and the second power source VCC2, and the second diode D22 may prevent a current from flowing from the second power source VCC2 to the auxiliary winding Aux2.

The first start unit 120b may include a second resistor R22 and a second transistor M22. One end of the second resistor R22 may be connected to the second node N22 and the other end thereof may be connected to the second transistor M22. A first electrode of the second transistor M22 may be connected to the second resistor R22, a second electrode thereof may be connected to a ground, and a gate electrode thereof may be connected to the second power source VCC2. In the first start unit 120b, a diode-connected transistor T12 and a Zener diode D12 may be connected between the other end of the second resistor R22 and the first electrode of the second transistor M22. Also, in the first start unit 120b, at least one of the second resistor R22, the diode-connected transistor T12, and the Zener diode D12 may be disposed on a path between the second node N22 and the second transistor M22 to form a predetermined voltage in the second node N22. The predetermined voltage formed in the second node N22 may be a voltage divided by the first resistor R12 and the second resistor R22.

The second start unit 130b may include a third resistor R32 and a third transistor M32. One end of the third resistor R32 may be connected to the second node N22 and the other end thereof may be connected to a first electrode of the third transistor M32. The first electrode of the third transistor M32 may be connected to one end of the third resistor R32 and a second electrode thereof may be connected to a ground.

Also, a stop signal may be delivered to a gate electrode of the third transistor M32. Here, it is illustrated that the third resistor R32 is connected between the gate electrode of the first transistor M12 and the first electrode of the third transistor M32, but the present invention is not limited thereto and at least one of a resistor, a Zener diode, and a transistor may be connected between the second node N22 and the first electrode of the third transistor M32 and apply a voltage to the second node N22.

In an embodiment, a calculation unit 140b delivering a stop signal may be further connected in the start-up circuit 100b. The calculation unit 140b may be connected to the second start unit 130b to deliver a stop signal to the second start unit 130b. In particular, the calculation unit 140b may deliver the stop signal to the gate electrode of the third transistor M32. The calculation unit 140b may include a plurality of logic gates, and the plurality of logic gates may include a NAND gate 141b, an inverter 142b, and a NOR gate 143b. The calculation unit 140b may process a stop signal, an enable signal en, and the like, using the respective logic gates, and output the stop signal at a predetermined time.

Figure 4:
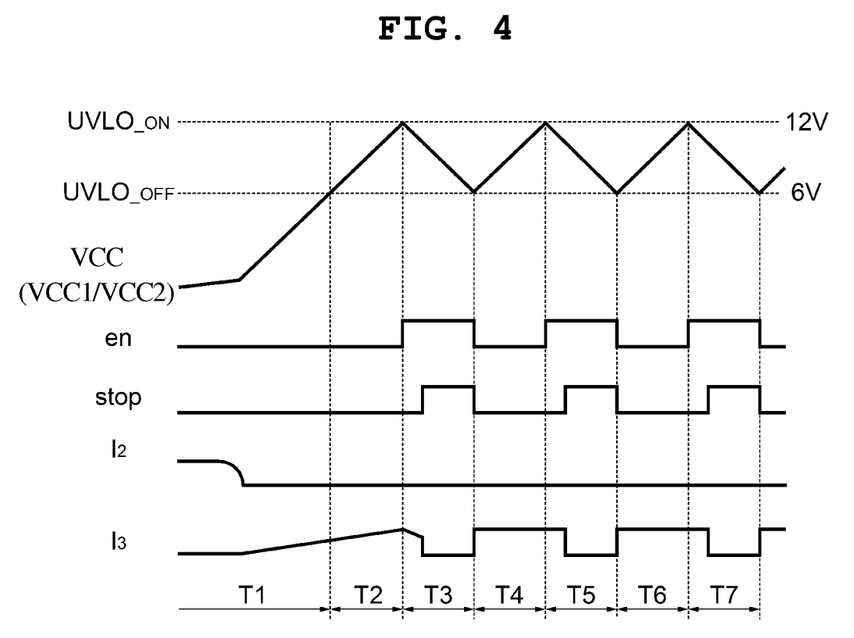
FIG. 4 is a timing diagram illustrating operations of the start-up circuit illustrated in FIGS. 2 and 3.

FIG. 4 is a timing diagram illustrating operations of the start-up circuit illustrated in FIGS. 2 and 3.

Referring to FIGS. 2 and 3, first, the JFET is turned on during a first section T1 and first powers $V_{STR1}$ and $V_{STR2}$ are delivered to the first nodes N11 and N12, respectively. When the first powers $V_{STR1}$ and $V_{STR2}$ are delivered to the first nodes N11 and N12, respectively, a second current I2 flows in the first start units 120a and 120b. Voltages divided by the first resistors R11 and R12 and the second resistors R21 and R22 may be applied to gate electrodes of the first transistors M11 and M12 through the second nodes N21 and N22 by the second current I2 to turn on the first transistors M11 and M12, respectively. When the first transistors M11 and M12 are turned on, the first current I1 flows from the first power sources $V_{STR1}$ and $V_{STR2}$ to the second power sources VCC1 and VCC2 and the first capacitors C11 and C12 may be charged with the first current I1 to increase voltages of the second powers VCC1 and VCC2. Here, a third current I3 may also be generated to flow in the second start units 130a and 130b.

When the voltages of the second powers VCC1 and VCC2 continue to increase in a second section T2 to reach a first voltage UVLO_OFF, the first voltage UVLO_OFF is delivered to gate electrodes of the second transistors M21 and M22, and thus, the second transistors M21 and M22 may be turned off. When the second transistors M21 and M22 are turned off, the second current I2 may be cut off. Here, third transistors M31 and M32 may be maintained in a turned-on state, and thus, the first transistors M11 and M12 may be maintained in a turned-on state. Since the first transistors M11 and M12 are kept to be turned on by the third transistors M31 and M32, the first capacitors C11 and C12 may be charged by the first current I1, allowing the voltages of the second powers VCC1 and VCC2 to continue to increase. When the voltages of the second powers VCC1 and VCC2 further increase to reach a second voltage UVLO_ON in the third section T3, a stop signal may be delivered to gate electrodes of the third transistors M31 and M32. When the stop signal is delivered to the gate electrodes of the third transistors M31 and M32, the third transistors M31 and M32 may be turned off. When the third transistors M31 and M32 are turned off, the third current I3 may be cut off to turn off the first transistors M11 and M12. Accordingly, the first current I1 may not flow to the first capacitors C11 and C12 any longer. When the first current I1 does not flow and currents charged in the first capacitors C11 and C12 are discharged, voltages of the second powers VCC1 and VCC2 may decrease while the stop signal is maintained. When the voltages of the second powers VCC1 and VCC2 decrease to reach the first voltage UVLO_OFF in the fourth section T4, the stop signal may be turned off, turning on the third transistors M31 and M32. When the third transistors M31 and M32 are turned on, the voltages of the second powers VCC1 and VCC2 may increase again.

In an exemplary embodiment, the stop signal that turns off the third transistors M31 and M32 may be delivered from the calculation units 140a and 140b. Also, when the voltages of the second powers VCC1 and VCC2 reach the second voltage UVLO_ON, the calculation units 140a and 140b may receive an enable signal en, and when a predetermined period of time has lapsed after the enable signal en was received, the calculation units 140a and 140b may generate a stop signal. However, a generation point of the stop signal is not limited thereto, and the stop signal may be synchronized with the enable signal en, and the enable signal en may be used as a stop signal. However, when the stop signal is generated a predetermined period of time after the enable signal en is generated, amounts of current charged in the first capacitors C11 and C12 are greater than the amounts of current when the stop signal is synchronized with the enable signal en, stably outputting voltages of the second powers VCC1 and VCC2.

Also, it is illustrated that third section T3 to seventh section T7 have a predetermined period, but the present invention is not limited thereto.

Power Device

<First Embodiment>

Figure 5:
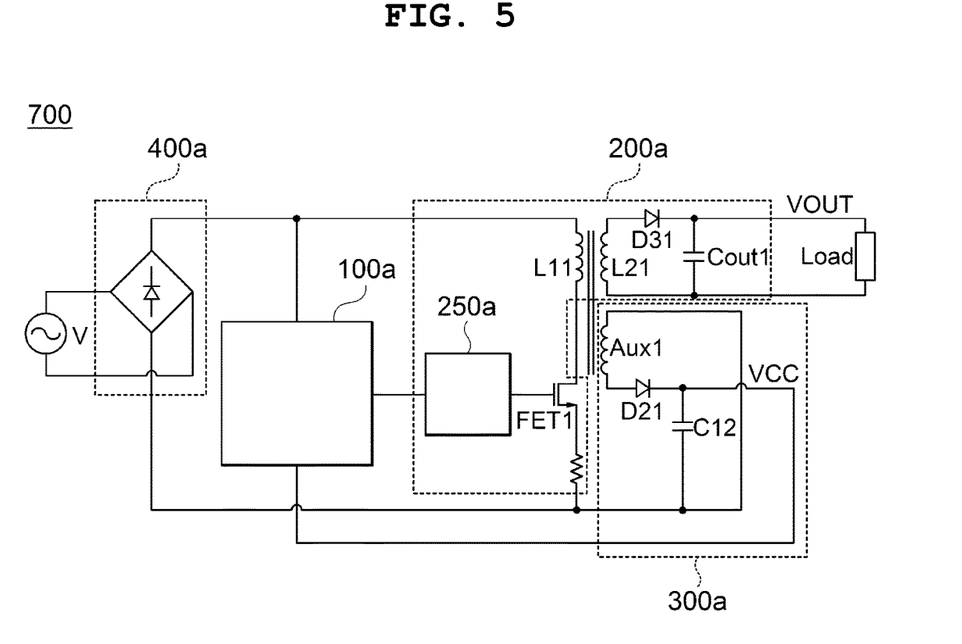
FIG. 5 is a circuit diagram of a power device using the start-up circuit illustrated in FIG. 2 according to an exemplary embodiment of the present invention.

FIG. 5 is a circuit diagram of a power device using the start-up circuit illustrated in FIG. 2 according to an exemplary embodiment of the present invention.

Referring to FIG. 5, a power device 700 may include a power generating unit 200a generating a predetermined voltage under the control of an IC controller 250a, a start-up circuit 100a supplying the predetermined voltage to the IC controller 250a, and a feedback unit 300a supplying a voltage generated by the power generating unit 200a to the start-up circuit 100a to correct the predetermined voltage to thus allow the power generating unit 200a to stably generate a voltage.

The power generating unit 200a may receive DC power and transform the received DC power into the predetermined voltage. The power generating unit 200a may include a first coil L11, a second coil L21, and a switching transistor FET1 connected to the first coil L11. The first coil L11 of the power generating unit 200a generates electromotive force as flow of current is changed according to ON/OFF operations of the switching transistor FET1, and the second coil L21 may output the predetermined voltage upon receiving the generated electromotive force from the first coil L11. The electromotive force generated by the first coil L11 may be adjusted according to ON/OFF operations of the switching transistor FET1. The predetermined voltage output from the second coil L21 may correspond to a winding ratio between the first coil L11 and the second coil L21. Here, a flyback converter is illustrated as the power generating unit 200a, but the present invention is not limited thereto and the power generating unit 200a may be one of various converters. The IC controller 250a may be connected to a gate electrode of the switching transistor FET1 to control ON/OFF operations of the switching transistors FET1.

The feedback unit 300a may include an auxiliary winding Aux1 and delivers a signal corresponding to the voltage generated by the auxiliary winding Aux1 to the start-up circuit 100a to enable the power generating unit 200a to output a stable voltage.

As illustrated in FIG. 2, the start-up circuit 100a may include a bias unit 110a, a first start unit 120a, and a second start unit 130a.

The bias unit 110a may include a first transistor M11 and a first resistor R11. A first electrode of the first transistor M11 and one end of the first resistor R11 may be connected to a first node N11, and a gate of the first transistor M11 and the other end of the first resistor R11 may be connected to a second node N21. A second electrode of the first transistor M11 may be connected to a second power source VCC1. A voltage of the second power source VCC1 may be a voltage stored in the first capacitor C11. In the bias unit 110a, a junction field effect transistor (JFET) may be connected between a first power source $V_{STR1}$ and the first node N11, and first power $V_{STR1}$ may be delivered to the first node N11 according to an operation of the JFET. The first capacitor C11 connected to the second power source VCC1 of the bias unit 110a may receive a voltage through an auxiliary winding Aux1 of the feedback unit 300a to correct a voltage charged therein. Also, a diode D21 may be connected between the auxiliary winding Aux1 and the second power source VCC1, and the diode D21 may prevent a current from flowing from the second power source VCC1 to the auxiliary winding Aux1.

The first start unit 120a may include a second resistor R21 and a second transistor M21. One end of the second resistor R21 may be connected to the second node N21 and the other end thereof may be connected to a first electrode of the second transistor M21. The first electrode of the second transistor M21 may be connected to the second resistor R21, a second electrode thereof may be connected to a ground, and a gate electrode thereof may be connected to the second power source VCC1. In the first start unit 120a, a diode-connected transistor T11 and a Zener diode D11 may be connected between the second resistor R21 and the second transistor M21. Also, in the first start unit 120a, at least one of the second resistor R21, the diode-connected transistor T11, and the Zener diode D11 may be disposed on a path between the second node N21 and the second transistor M21 to form a predetermined voltage in the second node N21. The predetermined voltage formed in the second node N21 may be a voltage divided by the first resistor R11 and the second resistor R21.

The second start unit 130a may include a third resistor R31 and a third transistor M31. One end of the third resistor R31 may be connected to the second node N21 and the other end thereof may be connected to the first electrode of the third transistor M31. The first electrode of the third transistor M31 may be connected to one end of the third resistor R31 and the second electrode thereof may be connected to a ground. Also, a stop signal may be delivered to a gate electrode of the third transistor M31.

In an embodiment, a calculation unit 140a delivering a stop signal may be further connected in the start-up circuit 100a. The calculation unit 140a may be connected to the second start unit 130a to deliver a stop signal to the second start unit 130a. In particular, the calculation unit 140a may deliver the stop signal to the gate electrode of the third transistor M31.

The power device 700 may further include a rectifying unit 400a. The rectifying unit 400a may rectify AC power into DC power and supply the rectified DC power to the power generating unit 200a.

The first power $V_{STR1}$ of the start-up circuit 100a may be power applied from the rectifying unit 400a to the first coil L11. In this case, a voltage of the first power $V_{STR1}$ may be higher than that of the second power VCC1 all the time.

<Second Embodiment>

Figure 6:
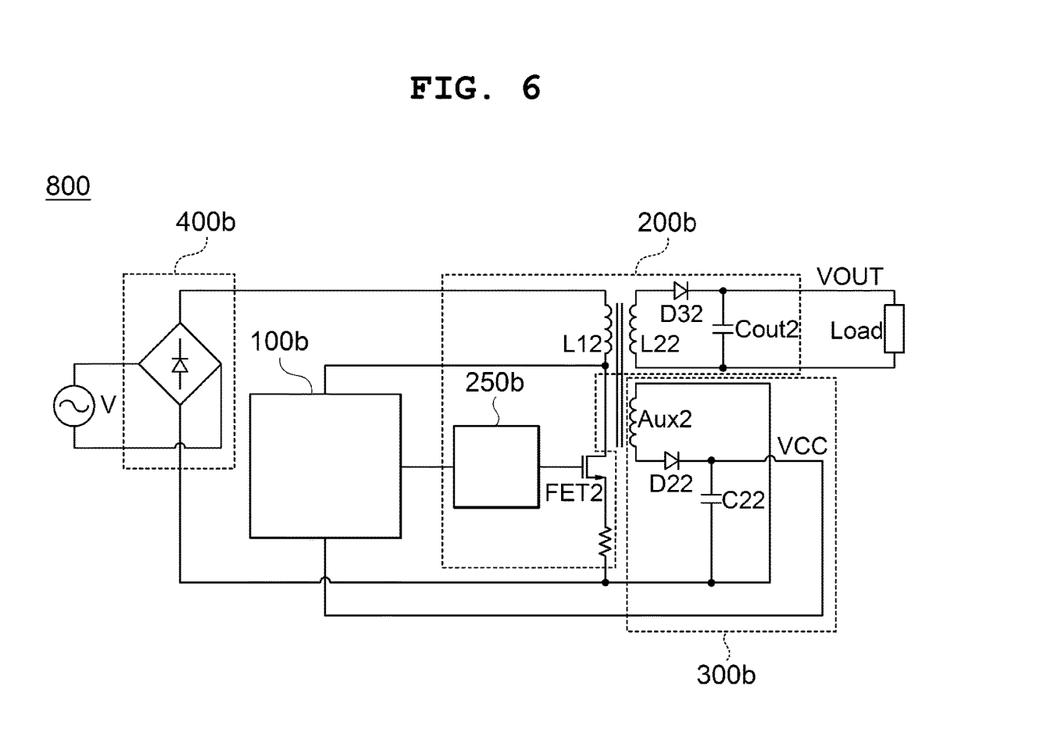
FIG. 6 is a circuit diagram of a power device using the start-up circuit illustrated in FIG. 3 according to another exemplary embodiment of the present invention.

FIG. 6 is a circuit diagram of a power device using the start-up circuit illustrated in FIG. 3 according to another exemplary embodiment of the present invention.

Referring to FIG. 6, a power device 800 may include a power generating unit 200b generating a predetermined voltage under the control of an IC controller 250b, a start-up circuit 100b supplying the predetermined voltage to the IC controller 250b, and a feedback unit 300b supplying a voltage generated by the power generating unit 200b to the start-up circuit 100b to correct the predetermined voltage to thus enable the power generating unit 200b to stably generate a voltage.

The power generating unit 200b may receive DC power and transform the received DC power into the predetermined voltage. The power generating unit 200b may include a first coil L12, a second coil L22, and a switching transistor FET2 connected to the first coil L12. The first coil L12 of the power generating unit 200b generates electromotive force as flow of current is changed according to ON/OFF operations of the switching transistor FET2, and the second coil L22 may output the predetermined voltage upon receiving the generated electromotive force from the first coil L12. The electromotive force generated by the first coil L12 may be adjusted according to ON/OFF operations of the switching transistor FET2. The predetermined voltage output from the second coil L22 may correspond to a winding ratio between the first coil L12 and the second coil L22. The IC controller 250b may be connected to a gate electrode of the switching transistor FET2 to control ON/OFF operations of the switching transistors FET2.

The feedback unit 300b may include an auxiliary winding Aux1 and delivers a signal corresponding to the voltage generated by the auxiliary winding Aux2 to the start-up circuit 100b to enable the power generating unit 200b to output a stable voltage.

As illustrated in FIG. 3, the start-up circuit 100b may include a bias unit 110b, a first start unit 120b, and a second start unit 130b.

The bias unit 110b may include a first transistor M12, a first resistor R12, and a first diode T22. A first electrode of the first transistor M12 and one end of the first resistor R12 may be connected to a first node N12, and a gate electrode of the first transistor M12 and the other end of the first resistor R12 may be connected to a second node N22. A second electrode of the first transistor M12 may be connected to an anode electrode of the first diode T22. The anode electrode of the first diode T22 may be connected to the second electrode of the first transistor M12, and a cathode electrode thereof may be connected to the second power source VCC2. When a voltage of the first power $V_{STR2}$ is lowered than that of the second power VCC2, the first diode T22 may prevent a current from flowing from the second power source VCC2 to the first power source $V_{STR2}$.

A voltage of the second power source VCC2 may be a voltage stored in the first capacitor C12. In the bias unit 110b, a junction field effect transistor (JFET) may be connected between a first power source $V_{STR2}$ and the first node N12, and first power $V_{STR2}$ may be delivered to the first node N12 according to an operation of the JFET. The first capacitor C12 connected to the second power source VCC2 of the bias unit 110b may receive a voltage through an auxiliary winding Aux2 of the feedback unit 300b to correct a voltage charged therein. Also, a diode D22 may be connected between the auxiliary winding Aux2 and the second power source VCC2, and the diode D22 may prevent a current from flowing from the second power source VCC2 to the auxiliary winding Aux2.

The first start unit 120b may include a second resistor R22 and a second transistor M22. One end of the second resistor R22 may be connected to the second node N22 and the other end thereof may be connected to the second transistor M22. A first electrode of the second transistor M22 may be connected to the second resistor R22, a second electrode thereof may be connected to a ground, and a gate electrode thereof may be connected to the second power source VCC2. In the first start unit 120b, a diode-connected transistor T12 and a Zener diode D12 may be connected between the second resistor R22 and the second transistor M22. Also, in the first start unit 120b, at least one of the second resistor R22, the diode-connected transistor T12, and the Zener diode D12 may be disposed on a path between the second node N22 and the second transistor M22 to form a predetermined voltage in the second node N22. The predetermined voltage formed in the second node N22 may be a voltage divided by the first resistor R12 and the second resistor R22.

The second start unit 130b may include a third resistor R32 and a third transistor M32. One end of the third resistor R32 may be connected to the second node N22 and the other end thereof may be connected to the first electrode of the third transistor M32. The first electrode of the third transistor M32 may be connected to one end of the third resistor R32 and the second electrode thereof may be connected to a ground. Also, a stop signal may be delivered to a gate electrode of the third transistor M32.

In an embodiment, a calculation unit 140b delivering a stop signal may be further connected in the start-up circuit 110b. The calculation unit 140b may be connected to the second start unit 130b to deliver a stop signal to the second start unit 130b. In particular, the calculation unit 140b may deliver the stop signal to the gate electrode of the third transistor M32.

The power device 800 may further include a rectifying unit 400b. The rectifying unit 400b may rectify AC power into DC power and supply the rectified DC power to the power generating unit 200b.

The first power source $V_{STR2}$ of the start-up circuit 100b may be connected between the first coil L12 and the switching transistor FET2 and have a predetermined voltage. Here, when the switching transistor FET2 is turned on, the voltage of the first power $V_{STR2}$ may decrease down to 0V. Then, the voltage of the first power $V_{STR2}$ is lower than that of the second power VCC2, allowing a current to flow from the second power source VCC2 to the first power source $V_{STR2}$. In order to prevent such a current flow, the bias unit 110b may connect the first diode T22 between the first transistor M12 and the second power source VCC2 to prevent a current from flowing from the second power source VCC2 to the first power source $V_{STR2}$. An anode electrode of the first diode T22 may be connected to the second electrode of the first transistor M12 and a cathode electrode thereof may be connected to the second power source VCC2. The first diode T22 may be formed as a transistor, and a first electrode and a gate of the transistor may be commonly connected to the second electrode of the first transistor M12 and a second electrode thereof may be connected to the second power source VCC2, allowing the transistor to be diode-connected.

According to the exemplary embodiments of the present invention, the start-up circuit and the power device using the same may reduce an amount of leakage current, thus reducing power consumption.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A start-up circuit, comprising:
a bias unit configured to allow a first current to flow from a first power source through the bias unit to a second power source, according to a predetermined voltage;
a first start unit configured to drive a second current to apply the predetermined voltage to the bias unit, and configured to stop driving the second current when a voltage received from the second power source reaches a first voltage;
a second start unit configured to drive a third current to apply the predetermined voltage to the bias unit, and configured to stop driving the third current upon receiving a stop signal,
wherein the first start unit comprises: a second resistor, and a second transistor,
wherein one end of the second resistor is connected to a gate electrode of a first transistor, and
wherein a first electrode of the second transistor is connected to the other end of the second resistor, a second electrode of the second transistor is connected to a ground, and a gate electrode of the second transistor is connected to the second power source.

2. The start-up circuit according to claim 1, wherein the bias unit includes comprises:
the first transistor,
wherein a first electrode of the first transistor is connected to the first power source, a second electrode of the first transistor is connected to the second power source, and the gate electrode of the first transistor is connected to the first start unit and the second start unit.

3. The start-up circuit according to claim 2, further comprising:
a diode connected between the second electrode of the first transistor and the second power source.

4. The start-up circuit according to claim 2, wherein the second start unit comprises:
a third resistor, and
a third transistor,
wherein one end of the third resistor is connected to the gate electrode of the first transistor, and
wherein a first electrode of the third transistor is connected to the other end of the third resistor, a second electrode of the third transistor is connected to the ground, and a gate electrode of the third transistor is connected to a stop signal line along which a stop signal is delivered.

5. The start-up circuit according to claim 1, wherein the second start unit is configured to cut off the third current when a predetermined period of time has lapsed after the voltage received from the second power source reached a second voltage.

6. The start-up circuit according to claim 1, wherein the stop signal is delivered to the second start unit when the voltage received from the second power source reaches a second voltage higher than the first voltage.

7. The start-up circuit according to claim 1, further comprising:
a calculation unit configured to deliver a stop signal to the second start unit.

8. A power device, comprising:
a power generating unit configured to generate a predetermined voltage under the control of an integrated circuit (IC) controller;
a start-up circuit configured to supply the predetermined voltage to the IC controller; and
a feedback unit configured to supply a voltage generated by the power generating unit to the start-up circuit, to correct the predetermined voltage to enable the power generating unit to stably generate a voltage,
wherein the start-up circuit includes:
a bias unit configured to allow a first current to flow from a first power source through the bias unit to a second power source, according to the predetermined voltage;
a first start unit configured to drive a second current to apply the predetermined voltage to the bias unit, and configured to stop driving the second current when a voltage received from the second power source reaches a first voltage; and
a second start unit configured to drive a third current to apply the predetermined voltage to the bias unit, and configured to stop driving the third current upon receiving a stop signal,
wherein the first start unit comprises: a second resistor, and a second transistor,
wherein one end of the second resistor is connected to a gate electrode of a first transistor, and
wherein a first electrode of the second transistor is connected to the other end of the second resistor, a second electrode of the second transistor is connected to a ground, and a gate electrode of the second transistor is connected to the second power source.

9. The power device according to claim 8, wherein the power generating unit comprises:
a rectifying unit,
a coil configured to receive a current from the rectifying unit, and
a switching transistor connected to the coil, and configured to switch a current flowing in the coil, and
wherein the first power of the start-up circuit is delivered from the rectifying unit to the coil.

10. The power device according to claim 8, wherein the bias unit comprises:
the first transistor,
wherein a first electrode of the first transistor is connected to the first power source, a second electrode of the first transistor is connected to the second power source, and the gate electrode of the first transistor is connected to the first start unit and the second start unit.

11. The power device according to claim 8, further comprising:
a diode,
wherein the bias unit comprises the first transistor,
wherein a first electrode of the first transistor is connected to the first power source, a second electrode of the first transistor is connected to the second power source, and the gate electrode of the first transistor is connected to the first start unit and the second start unit,
wherein the diode is connected between the second electrode of the first transistor and the second power source, wherein the power generating unit comprises:
a rectifying unit,
a coil configured to receive a current from the rectifying unit, and
a switching transistor connected to the coil, and configured to switch a current flowing in the coil, and
wherein a power of the start-up circuit between the coil and the switching transistor is the first power.

12. The power device according to claim 11, wherein the second start unit comprises:
a third resistor, and
a third transistor,
wherein one end of the third resistor is connected to the gate electrode of the first transistor, and
wherein a first electrode of the third transistor is connected to the other end of the third resistor, a second electrode of the third transistor is connected to the ground, and a gate electrode of the third transistor is connected to a stop signal line along which a stop signal is delivered.

13. The power device according to claim 8, wherein the second start unit is configured to cut off the third current when a predetermined period of time has lapsed after the voltage received from the second power source reached a second voltage.

14. The power device according to claim 8, wherein the stop signal is delivered to the second start unit when the voltage received from the second power source reaches the second voltage higher than the first voltage.

15. The power device according to claim 8, further comprising:
a calculation unit configured to deliver a stop signal to the second start unit.

* * * * *